Jan. 1, 1935.  W. K. HOLMES  1,985,926

TREATING HYDROCARBON OILS

Filed Dec. 28, 1928

Inventor
Will K. Holmes
By his Attorney
R. J. Dearborn

Patented Jan. 1, 1935

1,985,926

UNITED STATES PATENT OFFICE 1,985,926

TREATING HYDROCARBON OILS

Will K. Holmes, Port Arthur, Tex., assignor to The Texas Company, New York, N. Y., a corporation of Delaware Application December 28, 1928, Serial No. 328,890

4 Claims. (Cl. 196—58)

This invention relates to the cracking of hydrocarbon oils for the production of light products such as gasoline and naphtha and has particular reference to certain novel methods of refluxing distillates derived from the cracking of hydrocarbon oils.

When the evolved vapors from a pressure cracking still are subjected to dephlegmation while still under high pressure the constituents appear to undergo a certain stabilization so that the overhead vapor fraction from the dephlegmator, upon being collected as a condensate and given such chemical treatment as may be necessary, may constitute a marketable product of stable character. However, in cases where the cracking operation is carried on at relatively low pressures or where the dephlegmation or fractionation of the evolved vapors is caried on at comparatively low pressures, even though the cracking reaction may have taken place at much higher pressures, there appears to be a tendency for the gasoline or naphtha distillate thus obtained to be off color or of unstable character having a tendency to increase in color rapidly. Such instability may be particularly noticeable in distillates obtained from vapor phase cracking processes, wherein oils are cracked under vapor phase conditions and at comparatively low pressures. Furthermore, it is sometimes the case that when gasoline or naphtha constituents derived from a cracking reaction are recovered by subsequent distillation and collected as a distillate under conditions of relatively low pressure there is a tendency toward the production of an off color product or a product that is relatively unstable. Thus, for example, when tar or residue drawn from a pressure cracking still, or reflux condensate drawn from the fractionating tower, is subjected to distillation at low pressure, such as atmospheric pressure or thereabouts, to recover the gasoline constituents contained in the tar or in the reflux condensate it may be difficult to produce a gasoline distillate of desired color or of desired color stability.

In accordance with my invention gasoline or naphtha distillates which are off test or of unstable character or distillates derived from a cracking reaction are introduced into a dephlegmator or fractionating tower of a high pressure cracking system. The distillate thus charged into the tower may serve as a cooling reflux medium for the tower and upon being subjected to the fractionating and distilling action in the tower appears to undergo a certain digestion or perhaps a polymerizing reaction in the tower so that these gasoline constituents of high color or of unstable color as introduced into the tower are withdrawn therefrom together with the other gasoline vapors in the tower as a stable product of good color. Furthermore, in cases where the naphtha distillate thus introduced into the high pressure tower contains constituents of higher boiling point than desired for the gasoline distillate the heavier constituents are separated out in the tower so that an overhead distillate of desired distillation range may be obtained.

It appears that the higher the pressure at which the cracking reaction is carried on or the higher the pressure at which the dephlegmation or fractionation of the evolved vapors from the cracking system is conducted the greater the tendency toward the production of a gasoline or naphtha distillate of good color and having stability as to color. It may be that the higher pressure tends to promote a stabilizing reaction that may take place in the distillate after its removal from the cracking zone or it may be that lower vapor velocities which may obtain in the fractionating towers of the higher pressure batteries, as compared with higher vapor velocities through the lower pressure towers, may contribute to the production of more stable products in the higher pressure batteries. It may be that more saturated products are formed at the higher pressures. In any case one aspect of my invention seeks to take advantage of the fact that more stable products are formed under the higher pressures by taking a light distillate from a lower pressure battery and introducing it as a reflux medium into the dephlegmator of a higher pressure battery. Thus a number of batteries operated at varying pressures, such for example as three batteries, one operated at pressures of the order of 150 pounds, another operated at pressures of the order of 300 pounds, and another at pressures of the order of 600 pounds, may be hooked up so that the light distillate obtained from the lower pressure battery, that is, the 150 class battery, may be introduced to the fractionating tower of the 300 class battery and the light distillate from the 300 class battery conducted to the fractionating tower of the 600 class battery. In this way a final light distillate may be taken off the 600 class battery which is characterized by having an excellent color and of very high color stability.

Another discovery with which one aspect of my invention is concerned is that distillates obtained from the cracking of virgin stocks, that is, stocks that have not previously been subjected to a substantial cracking reaction, have a tendency to be less color stable than distillates obtained from the cracking of cycle stocks, that is, stocks that have been previously subjected to a cracking reaction. Thus for example, reduced crude or gas oil distillates, as obtained from the simple distillation of crude petroleum, do not ordinarily when subjected to cracking yield a gasoline or naphtha distillate of a given end point having as good color or color stability as those obtained by the cracking of cycle stocks, such as for example, distillates obtained from stripping the tar or residue formed in the cracking of these virgin stocks. One of the methods of operation contemplated by my invention, therefore, consists in withdrawing distillate obtained in cracking a virgin stock and introducing this distillate into a fractionating tower employed in treating the vapors formed in the cracking of a cycle stock or introducing the distillate into a fractionating tower maintained under higher pressure than that under which the treatment of the virgin stock was conducted.

In order to more fully disclose the invention reference will now be had to the accompanying drawing which illustrate examples of the invention and wherein.

Figure 1:
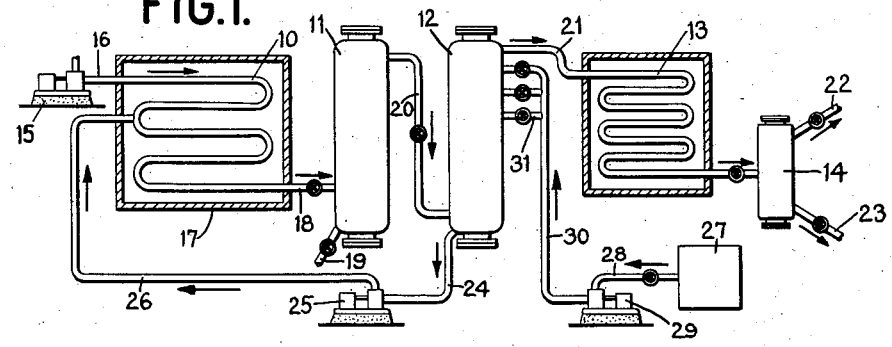
Figure 1 is a diagrammatic sectional elevation of an apparatus constructed in accordance with the invention and constituting an embodiment thereof.

In the apparatus illustrated in Figure 1 cracking apparatus is shown which includes a heating coil 10, a pressure still 11, a dephlegmator or fractionating tower 12, a condenser 13, and a receiving drum 14. A charging pump 15 is shown for introducing the charging stock through a charging line 16 to the coil 10 which is positioned in a furnace 17. A transfer line 18 is provided to conduct the heated oil from the coil 10 to the still 11 which may either be insulated to prevent loss of heat or may be suitably disposed in a furnace or other heating chamber. A single still is shown but if desired a plurality of stills may be employed. The still 11 is equipped with a tar or residue line 19 for drawing off residue to storage or to an apparatus for distilling the residue in order to recover therefrom its gasoline or naphtha content as well as heavier constituents adapted to be retreated for conversion into lighter hydrocarbons. The still 11 is in vapor communication with the dephlegmator or fractionating tower 12 by means of a vapor line 20. The tower may be in the form of a packed tower or a bubble tower or any suitable type of fractionating or rectifying equipment. A vapor line 21 conducts the vapor fraction from the tower to the condensing coil 13 and the final light distillate is collected in the receiver 14 which is shown equipped with a gas outlet pipe 22 and a liquid draw-off line 23. A line 24 is shown for conducting reflux condensate from the tower 12 to a hot oil pump 25 which forces the liquid through a line 26 to the heating coil 10. A tank 27 is provided for containing off test or unstable distillate which it is desired to introduce into the pressure fractionating tower 12. Thus this tank may contain for example gasoline or naphtha distillate obtained from a lower pressure battery or distillate obtained from stripping cracking still residue or reflux condensate from cracking operations or mixtures of any of these various products. An outlet pipe 28 extends from the tank 27 to a distillate pump 29 which discharges through a line 30 that is preferably equipped with a plurality of valved branch lines 31 so that the distillate may be introduced into such point or points in the tower 12 as may be desired.

In practicing the invention with the apparatus shown in Figure 1 a suitable charging stock which may either be a distillate or a residual petroleum oil, such as either a gas oil stock or a reduced crude, is introduced by the pump 15 into the coil 10 wherein the oil is preferably heated to a cracking temperature and then discharged into the still 11 wherein a body of oil is maintained under cracking temperatures and pressures to effect the desired cracking. Any suitable cracking temperatures and pressures may be employed but as an example of the invention temperatures of 800° to 900° F. may be given as suitable temperatures for the outlet of coil 10 with temperatures of for example 750° to 825° F. in the still 11 under 200 to 400 pounds pressure. The still 11 may be operated at approximately the pressure of the coil 10 or the pressure may be reduced in the still 11, although maintained under a high pressure preferably of the order of 200 pounds or higher. The vapors evolved in the cracking still pass through the vapor line 20 into the lower part of the dephlegmator 12. The temperature at the bottom of the tower may be within a range at which some cracking may take place. For example, the temperature may be of the order of 700° F. but there is a gradation of temperature upwardly through the tower so that as the vapors pass upwardly they come in contact with zones of progressively reduced temperature below that at which appreciable cracking takes place so that opportunity is afforded not only for the desired analytical distillation to separate out the gasoline fraction from higher boiling constituents but also facility is given for the digestion or stabilizing of the cracked products in the tower after cracking has ceased. The off test gasoline or naphtha or unstable distillate is introduced by the pump 29 onto the trays or sections of the tower desired to thus afford a cooling reflux for the tower to thereby control the end point of the vapor fraction which passes off through the vapor line 21 to the condenser 13 and which is collected as a condensate in the receiver 14. The off test or unstable distillate thus introduced is subjected to the digestion or stabilizing action in the tower which takes place under the pressure obtaining therein, which pressure may be substantially that of the still 11 or, if reduced, is nevertheless a substantial superatmospheric pressure which should be of the order of at least 100 pounds and is preferably 200 pounds or higher.

Figure 2:
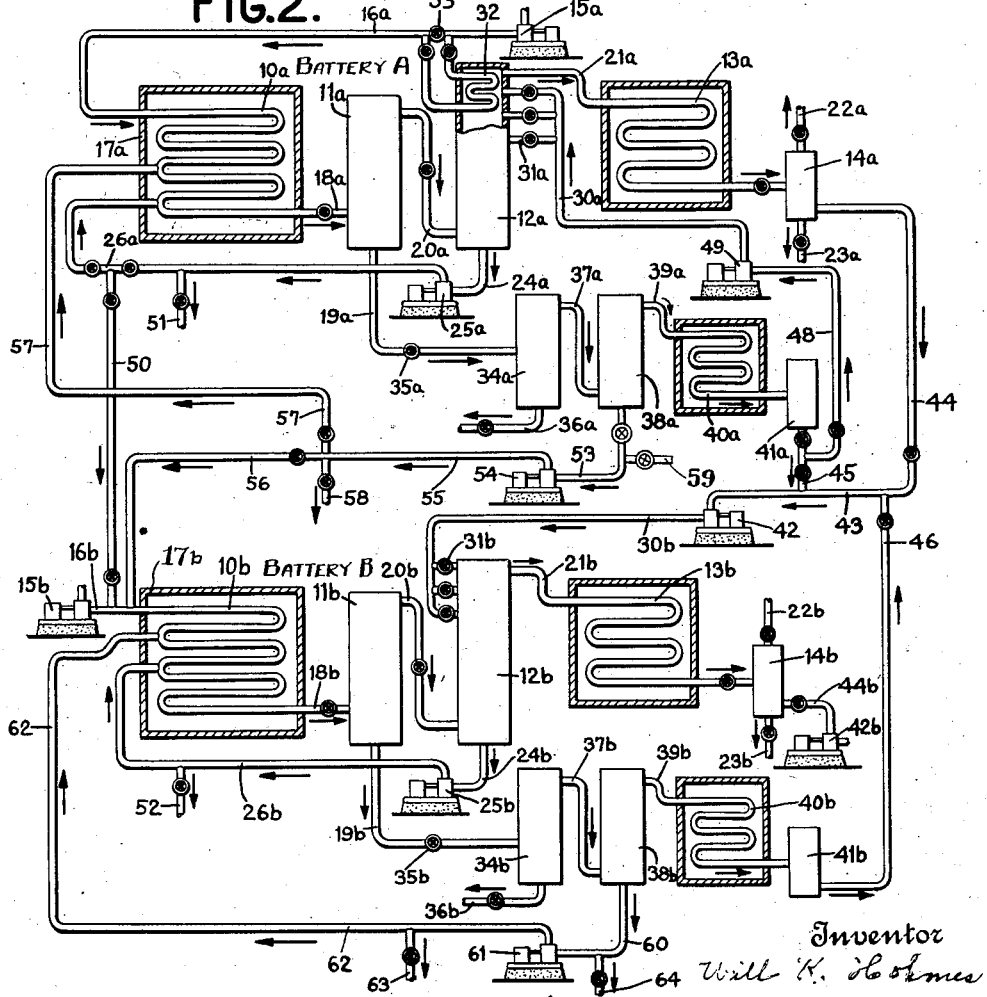
Figure 2 is a flow diagram illustrating a modified form of the invention in which a plurality of batteries of cracking stills are shown.

In the apparatus illustrated in Figure 2, two batteries of pressure cracking stills are shown designated as batteries A and B; the former being the lower pressure battery and the latter being the higher pressure battery. The equipment of each of these batteries is similar in general to the battery shown in Figure 1 except that the batteries of Figure 2 are shown provided with individual tar strippers and they are interconnected in a manner to be presently explained.

Thus it will be seen that battery A includes a heating coil 10a located in a furnace 17a and connected by a transfer line 18a to a cracking still 11a, which may be insulated to retard loss of heat or may be installed in a furnace or other heating chamber. A single still is shown but if desired a plurality of stills may be employed. A vapor line 20a is shown extending from the still 11a to a dephlegmator or fractionating tower 12a and a vapor line 21a is provided to conduct the vapor fraction to a condenser 13a provided with a receiver 14a for collecting the distillate, which receiver is equipped with a gas outlet line 22a and distillate draw-off line 23a. A charging pump 15a is shown having a charging line 16a extending to the coil 10a. The charging line illustrated includes branch lines leading to a coil 32 positioned in the tower 12a so as to use charging stock as a cooling medium for the tower and a by-pass line 33 is included so that if desired the coil 32 may be by-passed. A line 24a is provided for removing reflux condensate from the tower 12a to a hot oil pump 25a by which the condensate is forced through a line 26a to the coil 10a.

With battery A is a tar stripping equipment including an expansion chamber 34a which is supplied with tar or residue from the cracking still 11a by the line 19a in which is placed a pressure reducing valve 35a. The expansion chamber is shown equipped with a draw-off line 36a for removing the stripped residue or fuel oil and with a vapor line 37a extending to a dephlegmator or fractionating tower 38a. A vapor line 39a extends to a condenser coil 40a provided with a distillate receiver 41a.

Battery B includes a heating coil 10b located in a furnace 17b and connected by a transfer line 18b to a cracking still 11b, which may be insulated to retard loss of heat or may be installed in a furnace or other heating chamber. A single still is shown but if desired a plurality of stills may be employed. A vapor line 20b is shown extending from the still 11b to a dephelgmator or fractionating tower 12b and a vapor line 21b is provided to conduct the vapor fraction to a condenser 13b provided with a receiver 14b for collecting the distillate. The receiver is shown with a gas outlet line 22b and distillate draw-off line 23b. A line 24b is provided for removing reflux condensate from the tower 12b to a hot oil pump 25b by which the condensate is forced through a line 26b to the coil 10b.

With battery B is a tar stripping equipment including an expansion chamber 34b which is supplied with tar or residue from the cracking still 11b by the line 19b in which is placed a pressure reducing valve 35b. The expansion chamber is shown equipped with a draw-off line 36b for removing the stripped residue or fuel oil and with a vapor line 37b extending to a dephlegmator or fractionating tower 38b. A vapor line 39b extends to a condenser coil 40b provided with a distillate receiver 41b.

The fractionating tower 12a of battery A is provided with a line 30a having branch lines 31a for introducing reflux at selected points in the tower and similarly the tower 12b of battery B has a reflux charging line 30b provided with branch lines 31b. A pump 42 is provided for pumping condensate through the line 30b to the tower 12b to serve as reflux therefor, the pump being equipped with an inlet pipe 43 having branches 44, 45 and 46. The line 44 extends to the distillate receiver 14a which receives the pressure distillate of battery A. The line 45 extends to the distillate receiver 41a which receives the light distillate from the tar stripper of battery A and the line 46 extends to the receiver 41b which receives the light distillate from the tar stripper of battery B. Thus gasoline or naphtha distillates from the tar strippers of either or both batteries may be introduced into the relatively high pressure fractionating tower 12b for stabilizing treatment and the pressure distillate collected in the receiver 14a, which may not be of as high a degree of stability as the pressure distillate made on battery B, may be taken off the lower pressure battery and introduced into the fractionating tower 12b of the higher pressure battery for stabilizing treatment. The line 45 is shown provided with a branch line 48 extending to a pump 49 which discharges into the line 30a so that a part or all of the light distillate from the tar stripper of battery A may be conducted to the pressure fractionating tower 12a of that battery to serve as a reflux medium therefor. The receiver 14b is shown equipped with a line 44b extending to a pump 42b so that pressure distillate collected in the receiver may, if desired, be conducted to a still higher pressure battery.

The line 26a is shown provided with a branch line 50 extending to the charging line 16b so that reflux condensate obtained in the fractionating tower 12a of the lower pressure battery, instead of being cycled back to the cracking zone of the same battery, may be conducted to the cracking zone of the higher pressure battery. The line 26a is also shown with an additional branch line 51 so that the reflux condensate may if desired be conducted to a still higher pressure battery than battery B or otherwise utilized. Similarly, the line 26b may be provided with a branch line 52 so that if desired the reflux condensate from the fractionating tower 12b of the higher pressure battery B may be conducted to a still higher pressure battery or otherwise utilized.

The reflux condensate obtained in the fractionating tower 38a of the tar stripper of battery A may be withdrawn by a line 53 extending to a hot oil pump 54 having a discharge line 55 provided with branch lines 56, 57, and 58. The line 56 connects with the charging line 16b. The line 57 extends to the coil 10a and the line 58 may extend to another still higher pressure battery, not shown. Thus the reflux condensate obtained from the tar stripper of battery A, which condensate in refinery practice is commonly referred to as cycle stock, may either be conducted to the cracking zone of the higher pressure battery B to constitute the charging stock therefor, or it may be passed back to the cracking zone of the battery on which it was made or conducted to a still higher pressure battery. The line 53 is shown as having a branch line 59 so that if desired the cycle stock may be removed to tankage or otherwise utilized. The cycle stock or reflux condensate contained in the fractionating tower 38b of the tar stripper of battery B may be withdrawn through a line 60 to a hot oil pump 61 having a discharge line 62 extending to the coil 10b. The line 62 is provided with a branch line 63 so that the reflux condensate may be passed to a higher pressure battery and the line 60 is shown equipped with a branch line 64 so that the condensate may if desired be removed to tankage or otherwise utilized.

In operating with the apparatus shown in Figure 2 the charge to battery A may comprise a virgin stock, such as a gas oil distillate obtained from the crude stills, or the charge may consist of a mixture of virgin stock and cycle stock. The charge to the cracking zone of battery B may consist entirely of cycle products obtained from the lower pressure battery A such as the reflux condensate from the pressure fractionating tower 12a or the reflux condensate from the tar stripper fractionating tower 38a or mixtures of these condensates. If desired, additional charging stock may be admitted to the battery B by means of the pump 15b and charging line 16b, which charge may be either a virgin stock or a cycle stock, or mixtures thereof but is preferably a cycle stock. Battery A may, for example, be operated with 200 pounds pressure in the fractionating tower 12a and battery B operated with 400 pounds pressure in the fractionating tower 12b.

In one method of operation a virgin stock is charged to battery A and a cycle stock comprising cycle products from battery A or from other sources is charged to battery B and the light distillate taken off battery A, or the virgin stock battery, is thus introduced to the fractionating tower 12b of battery B, that is the cycle stock battery. Thus the distillate obtained in cracking the virgin stock which distillate may be highly unstable as compared with the distillate obtained in cracking the cycle stock is stabilized by the treatment under the higher pressure.

In one application of the invention a battery of pressure stills may be operated under substantially liquid phase cracking conditions at pressures of the order of 400 to 600 pounds, evolved vapors being fractionated in a suitable fractionating tower at approximately the same pressures. Naphtha obtained from a vapor phase cracking unit, which may have an equivalent or a higher end point than that of ordinary gasoline, is introduced into the fractionating tower of the high pressure battery. The vapor phase cracking operation may be carried on at pressures only slightly greater than atmospheric pressure, and the fractionation of the vapors evolved may take place under conditions of pressure of say approximately atmospheric up to about 25 pounds. The vapors when condensed to form a distillate may be pumped into the fractionating tower of the high pressure battery, which may operate in the neighborhood of 400 pounds pressure. Ordinarily, improvement in the vapor phase distillate may be effected in towers operated at lower pressures, for example at 100 pounds, but the stabilizing effect may be increased by carrying on the final fractionation at higher pressures. The vapors evolved from the high pressure fractionating tower will consist of a mixture of the products of the high pressure liquid phase cracking reaction and the lower pressure vapor phase cracking reaction, and the product thus obtained will be of much greater stability than the original distillate produced from the vapor phase process.

Thus, for example, in the apparatus of Figure 2, battery A may be operated under vapor phase cracking conditions at relatively low pressure and the vapor phase cracked distillate collected in the receiver 14a, while battery B may be operated under higher pressures and the vapor phase cracked distillate drawn from receiver 14a through lines 44 and 43 may be introduced by pump 42, line 30b and any of the branch lines 31b into the fractionating tower 12b wherein the vapor phase cracked distillate may be subjected to fractionation and polymerization under the higher pressure obtaining in the tower 12b.

The pressure differential between that obtaining in the pyrogenesis or formation of the unstable distillate and that under which the stabilizing treatment is carried on may be varied within comparatively wide limits. It is preferable, however, in order to obtain best results to have a differential of at least the order of 100 pounds and in the case of the more highly unstable distillates, such as those ordinarily obtained from vapor phase cracking, it is desirable to have several hundred pounds differential.

Although the distillate introduced into the pressure fractionating tower in accordance with my invention may be preheated before being admitted to the tower it is ordinarily preferable to introduce the distillate without such preheating due to the fact that the distillate may readily be subjected to the desired heat in the tower and by introducing it at normal temperatures or without preheating the distillate is thus available to supply cooling for the fractionating tower.

It is to be understood that in the description given in this specification of the production of distillates of high color stability it is not meant to imply that such distillates are necessarily of high color stability when collected as distillates from the fractionating tower and that these distillates ordinarily require chemical treatment which usually includes treatment with sulfuric acid whereupon a product of high color stability is obtained.

Obviously many modifications and variations of the invention, as hereinbefore set forth, may be made without departing from the spirit and scope thereof, and therefore, only such limitations should be imposed as are indicated in the appended claims.

I claim:

1. In the conversion of higher boiling hydrocarbon oils into lower boiling ones, the process that comprises subjecting hydrocarbon oil to cracking temperature under superatmospheric pressure to effect cracking in a cracking still wherein separation into vapors and liquid residue occurs, withdrawing liquid residue from the cracking still and subjecting it to distillation at a reduced pressure approximating atmospheric to thereby separate said liquid residue into a stripped residue and a vapor fraction, subjecting said vapor fraction to fractionation in a low pressure fractionating zone to separate out a heavier condensate and a gasoline distillate characterized in having a higher color than desired for the final gasoline product, passing the separated vapors from the cracking still into a fractionating tower maintained under a superatmospheric pressure of upwards of 200 lbs. and subjecting the vapors to fractionation therein to form a reflux condensate and a vapor fraction comprising gasoline, withdrawing the gasoline distillate of high color separated out in the low pressure fractionating zone and introducing it into said higher pressure fractionating tower to thereby subject said gasoline distillate to reconditioning and refractionation under the high pressure therein and condensing said vapor fraction from the high pressure fractionating tower to form a final gasoline distillate of desired color and stability.

2. In the conversion of higher boiling hydrocarbon oils into lower boiling ones, the process that comprises subjecting hydrocarbon oil to cracking temperature under superatmospheric pressure to effect cracking in a cracking still wherein separation into vapors and liquid residue occurs, withdrawing liquid residue from the cracking still and subjecting it to distillation at reduced pressure to thereby separate said liquid residue into a stripped residue and a vapor fraction, subjecting said vapor fraction to fractionation in a low pressure fractionating zone to separate out a heavier condensate and a gasoline distillate characterized in having a higher color and end point than desired for the final gasoline product, passing the separated vapors from the cracking still into a fractionating tower maintained under a superatmospheric pressure of the order of 200 to 400 pounds and subjecting the vapors to fractionation therein to form a reflux condensate and a vapor fraction comprising gasoline, withdrawing the gasoline distillate of high color and end point separated out in the low pressure fractionating zone and introducing it into said higher pressure fractionating tower to thereby subject said gasoline distillate to reconditioning and refractionation under the high pressure therein, and condensing said vapor fraction from the high pressure fractionating tower to form a final gasoline distillate of desired color and distillation range.

3. In the conversion of higher boiling hydrocarbon oils into lower boiling ones, the process that comprises heating a restricted stream of hydrocarbon oil in transit through a heating coil to raise the oil to cracking temperature while under a relatively low superatmospheric pressure, passing the stream of oil into an enlarged chamber maintained under a relatively low superatmospheric pressure and at a cracking temperature and wherein separation of vapors from liquid takes place, passing the separated vapors into a fractionating tower and subjecting them to fractionation therein to separate out a heavier condensate and a gasoline distillate, heating another restricted stream of hydrocarbon oil in transit through a second heating coil to raise the oil to cracking temperature while under a pressure of upwards of 200 pounds higher than that obtaining in the other heating coil, passing the stream of oil from the second heating coil into a second enlarged chamber maintained at cracking temperature under a superatmospheric pressure exceeding that of the first enlarged chamber and wherein separation of vapors from liquid takes place, passing the separated vapors into a second fractionating tower and subjecting them to fractionation therein under a pressure of upwards of 100 pounds higher than that of the first fractionating tower to separate out a vapor fraction comprising gasoline, withdrawing the gasoline distillate produced in the first fractionating tower and introducing it into the second fractionating tower to thereby subject said gasoline distillate to reconditioning and refractionation under the high pressure therein, and condensing said vapor fraction from the high pressure fractionating tower to form a final gasoline distillate.

4. In the conversion of higher boiling hydrocarbon oils into lower boiling ones, the process that comprises subjecting a hydrocarbon oil in a cracking zone to cracking temperature under superatmospheric pressure to effect cracking and vaporization, subjecting evolved vapors to fractionation in a fractionating tower while under a superatmospheric pressure of upwards of 400 pounds to form a reflux condensate and a vapor fraction comprising gasoline, heating another oil to a vapor phase cracking temperature under a pressure approximating atmospheric to subject the oil to vapor phase cracking, fractionating the products of the vapor phase cracking to separate out a heavier fraction thereof and a lighter fraction thereof comprising gasoline, introducing said lighter fraction into the high pressure fractionating tower to thereby subject said fraction to reconditioning and refractionation under the high pressure therein and condensing the vapor fraction from the high pressure fractionating tower to form a final gasoline distillate.

WILL K. HOLMES.